United States Patent Office 2,855,329
Patented Oct. 7, 1958

2,855,329
PROCESS FOR MAKING A FRICTION LINING

Henry C. Morton, Branford, Conn., assignor to The Russell Manufacturing Company, Middletown, Conn., a corporation of Connecticut No Drawing. Application September 16, 1955
Serial No. 534,894

3 Claims. (Cl. 117—66)

This invention relates to the production of friction material for use as clutch or brake linings or the like and more specifically to a clutch facing for use in automatic automotive transmissions wherein the facing is required to operate in oil.

An object of the invention is to provide a friction lining of the above type which will maintain a high coefficient of friction when operating in oil.

Another object is to provide a clutch facing of the above type which is uniformly impregnated with friction material.

Another object is to provide a novel and improved method of producing a friction lining of the above type.

Various other objects and advantages will be apparent as the nature of the invention is more fully disclosed.

In accordance with the present invention the friction lining is composed of a base material such as asbestos tape or the like, which is impregnated uniformly throughout with an amorphous form of colloidal silica which is extremely resistant to heat and possesses a high coefficient of friction. The base material is first impregnated with a silica-forming solution and the silica is precipitated in situ, thereby producing a uniform deposit of colloidal silica throughout the base material.

Various organo silicates, such as ethyl silicate, tetraethyl ortho silicate, or methyl silicate are soluble in alcohol. In the presence of a mineral acid they are hydrolyzed to alcohol and silicic acid and the silicic acid in turn dehydrates to an amorphous form of colloidal silica of the type above mentioned.

In accordance with the present invention a hydrated silicate solution of this type is used to impregnate the base material which may comprise a woven or non-woven asbestos tape, asbestos mill board, cold molded or dry mixed friction compounds and the like. After impregnation the material is heated to a temperature to dehydrate the silicic acid and produce a uniform deposition of colloidal silica throughout the material. The silica impregnated material may then be resin bonded and formed into the brake.

As a specific example five volumes of ethyl silicate and one volume of one percent hydrochloric acid (dry weight in water) are mixed and vigorously stirred and allowed to stand for a short period of time such as twenty minutes, after which the mixture is diluted with five volumes of water. The resulting solution contains about seventeen percent of its weight of silica. Other mineral acids may be used to assist in the hydrolysis but hydrochloric acid is preferred due to its commercial availability. The concentration may be such as to produce a hydrogen chloride concentration of 0.3% to 5.0% before dilution.

This hydrolyzed silicate solution is used to impregnate a woven asbestos tape or other base material after which the material may be dried for some twelve hours in air at atmospheric temperature or may be oven dried for one or two hours at 250° F. or until the dehydration is completed. This results in a uniform deposition of amorphous colloidal silica throughout the mass of the treated material.

The weight of the silica deposit from the above solution may amount to about 24% by weight of the material. This amount can be varied as desired by dilution or concentration of the impregnating solution.

The dried and treated tape may be impregnated with a 60% solution of phenol formaldehyde resin dissolved in alcohol or of an oil modified resin for one or two hours, air dried to remove the solvent and heat dried for one to one and one-half hours at 150° F. to advance the cure of the resin. The tape may also be coated with synthetic rubber either alone or in combination with heat reactive resins for adding strength to the material.

If desired other friction-modifying agents may be incorporated in the base material such as barium sulfate, various oxides of iron, carbon black or powdered metals such as zinc, copper, iron, tin, etc. in a manner well known in the art.

For making clutch or brake linings the partly cured material is then pressed in a conventional mold for four or five minutes at about 350° F. under a pressure of 2500 to 3000 pounds per square inch.

After removal from the mold the heat-set linings or facings are oven baked for one or two hours at about 350° F. to complete the curing of the resin.

The proportions of the resin and silica may be varied by varying the concentration of the various solutions. In general the silica may vary from 5% to 24% and the resins from 10% to 30% of the weight of the asbestos tape base according to the characteristics desired.

Obviously the times and temperatures of the various drying and curing steps can be varied in accordance with accepted commercial practice.

Friction linings made in the above described manner exhibit a high coefficient of friction even when operated in oil, as in automatic automobile transmissions. The silica, by virtue of having been deposited from solution in situ, is present in colloidal form uniformly dispersed throughout the base material, resulting in a stable coefficient of friction even after long continued use. The heat resistance of the friction lining is enhanced because of the inherent high temperature resistance of the deposited silica.

What is claimed is:

1. The method of producing a friction lining which comprises impregnating a fibrous asbestos base material with a water solution of a hydrolyzed, acidified organo silicate and drying said impregnated material at a temperature to dehydrate the same and precipitate amorphous colloidal silica in situ whereby a uniform deposit of said amorphous colloidal silica is deposited as a coating on the fibers of said asbestos base material, and then impregnating the resultant product with a bonding resin.

2. The method of forming a friction lining which comprises impregnating a fibrous asbestos base material with a water solution of hydrolyzed, acidified ethyl silicate and drying said impregnated material to dehydrate the same and cause the silica to be precipitated in situ from the solution whereby a uniform deposit of said amorphous colloidal silica is deposited as a coating on the fibers of said asbestos base material, and then impregnating resulting product with a bonding agent.

3. The method of forming a friction lining which comprises impregnating a fibrous asbestos base material with a water solution of hydrolized acidified ethyl silicate and drying said impregnated material to dehydrate the same and cause the silica to be precipitated in situ from the solution, whereby a uniform deposit of said amorphous colloidal silica is deposited as a coating on the fibers of said asbestos base material impregnating the product with the resin, molding the composition into the desired form and curing the resin.

References Cited in the file of this patent

UNITED STATES PATENTS

| | | |
|---|---|---|
| 1,561,988 | Laurie | Nov. 17, 1925 |
| 1,809,755 | King et al. | June 9, 1931 |
| 2,033,928 | Driscoll et al. | Mar. 17, 1936 |
| 2,058,844 | Vaughn | Oct. 27, 1936 |
| 2,159,935 | Sanders | May 23, 1939 |
| 2,597,872 | Iler | May 27, 1952 |
| 2,611,727 | Underwood et al. | Sept. 23, 1952 |

OTHER REFERENCES

Silicones and their uses, "McGregor," 1954, McGraw-Hill, pages 31 and 32 relied on.